Patented Nov. 14, 1922.

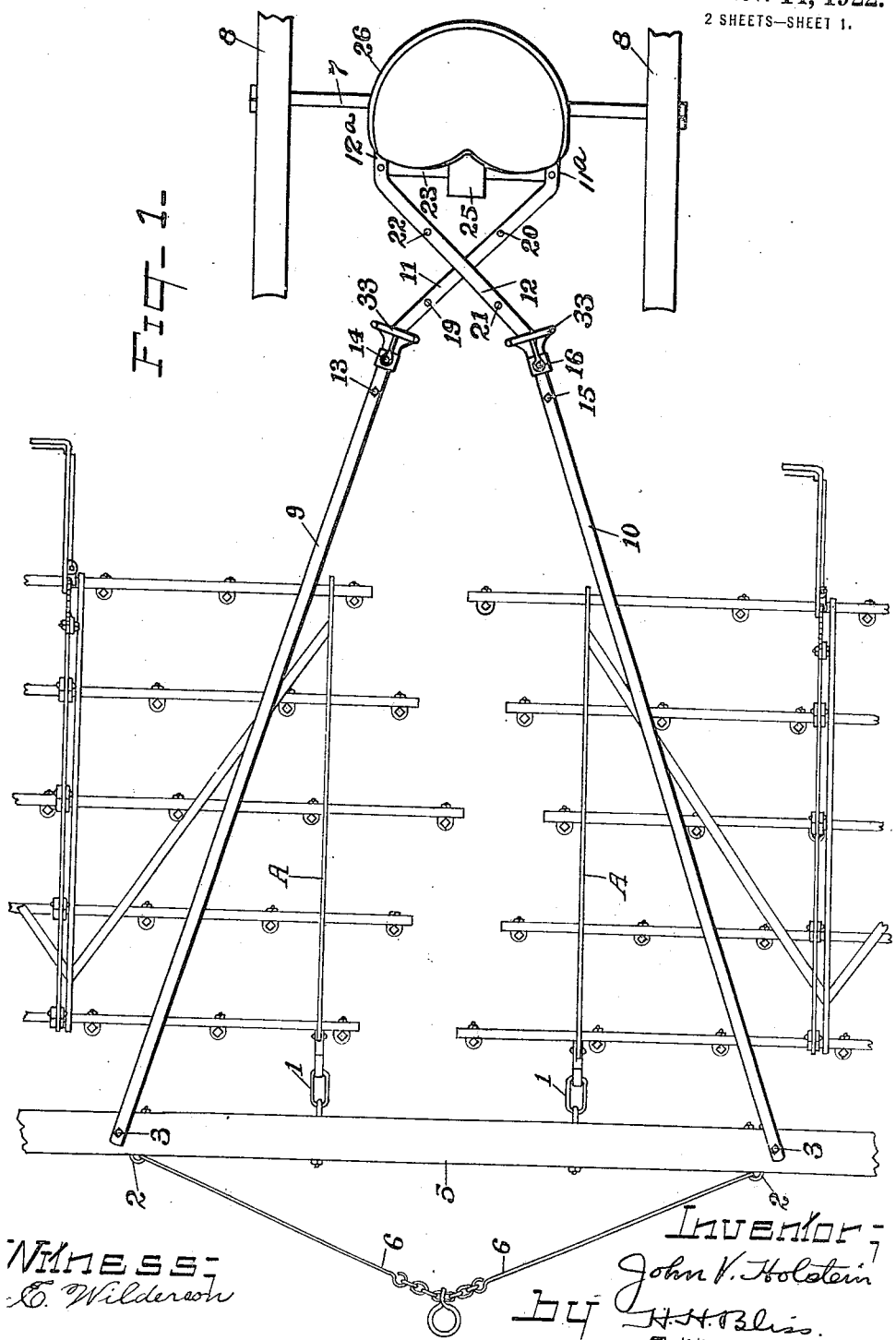

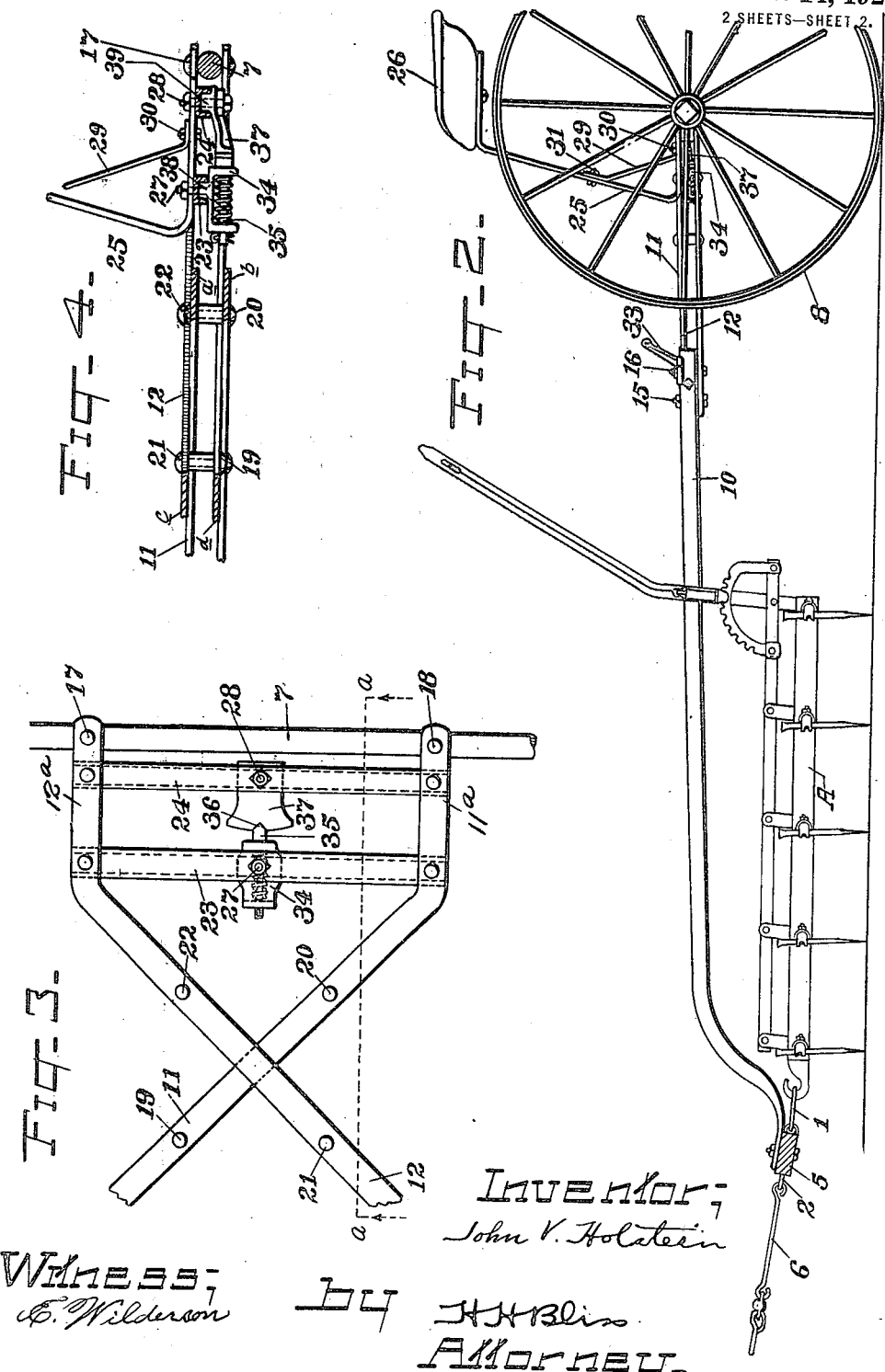

1,435,161

UNITED STATES PATENT OFFICE.

JOHN V. HOLSTEIN, OF MOLINE, ILLINOIS, ASSIGNOR TO DEERE & COMPANY, OF MOLINE, ILLINOIS, A CORPORATION OF ILLINOIS.

RIDING ATTACHMENT.

Application filed June 24, 1920. Serial No. 391,363.

*To all whom it may concern:*

Be it known that I, JOHN V. HOLSTEIN, a citizen of the United States, residing at Moline, in the county of Rock Island and State of Illinois, have invented certain new and useful Improvements in Riding Attachments, of which the following is a specification, reference being had therein to the accompanying drawing.

My invention relates to riding attachments for agricultural implements and is especially adapted for use with harrows.

An object of the invention is to provide a riding attachment having crossed draft bars by which the position of the riding attachment is automatically maintained in the desired position relative to the implement and in which the operator's seat is supported by the draft bars; in which the operator's seat, by reason of being supported by the draft bars, is automatically controlled by actuation of the draft bars to properly position the driver relative to the implement when turning corners; in which the seat is supported by the draft bars in a manner to prevent lateral twists of the seat when the attachment is being used on rough uneven ground or when one of the wheels strikes an obstruction.

A further object is to provide a yielding lock to hold the wheels of the riding attachment in a straight course and that will automatically release when the course of the implement is changed.

Referring to the drawings in which similar numerals indicate identical parts;

Figure 1 is a plan view of my invention applied to a drag harrow of a well known type.

Figure 2 is a side elevation of Figure 1.

Figure 3 is a detail plan view with the seat and seat supports removed, showing the automatic locking means.

Figure 4 is a sectional view on line $a$—$a$ of Figure 3, but with the seat spring and brace in position.

A—A illustrate sections of a drag harrow of a well known type and construction attached to a draw bar 5 by means of the usual links 1—1. 6—6 are draft links attached to the draw bar 5 by means of U-bolts 2. 7 is the axle of the riding attachment normally parallel with the draw bar 5. 8—8 are wheels, each rotatably mounted on one of the ends of the axle 7. 9 and 10 are rearwardly converging draft bars pivoted at their front ends to the draw bar 5 by means of bolts 3. 11 and 12 are extensions of the draft bars 9 and 10 respectively each being rigidly secured to one of said bars by means of bolts or rivets 13—14 and 15—16. The extensions 11 and 12 are crossed at a point in front of the axle 7 and are then bent to form two parallel arms 11ª, 12ª having their ends pivoted to the axle by means of rivets or bolts 17 and 18 and positioned at right angles thereto.

By referring to Figures 2 and 4, it will be seen the extensions 11 and 12 of the draft bars 9 and 10 are each composed of two units, $a$—$b$ and $c$—$d$ respectively, each pair of units held in spaced vertical relationship by suitable spacers 19—20 and 21—22. These spacers also serve as a stop to prevent the riding attachment turning too short and the wheels striking the draft bars. The units of the extensions 11 and 12 interlace at the point where they cross, that is, the unit $a$ of the extension 11 passes under the unit $c$ of the extension 12, and the unit $b$ of the extension 11 passes under the unit $d$ of the extension 12. This construction materially strengthens the structure and prevents sagging of the draft bars from the weight of the operator and also prevents buckling of the draft bars from the compression strains that are set up when the implement is turned.

23 and 24 are spaced parallel channel members each pivoted at each end to the extensions 11 and 12 respectively and positioned on lines in front of the axle and parallel thereto. 25 is a seat spring supported by the members 23 and 24 and is positioned at right angles thereto and the seat spring 25 is pivoted to the members 23 and 24 by bolts 27 and 28 respectively. 26 is the seat secured to the upper end of the seat spring 25. 29 is a brace for the seat spring 25 and is fastened at its lower end to the base portion of the seat spring by means of a bolt 30 and to the upright portion by a bolt 31. 33, 33 represent foot rests secured to the draft bars 9 and 10 by means of the bolts 14 and 16 respectively.

By the arrangement of parts as above described it will be seen that when a corner is turned the axle 7 will be angled by means of the extension 11 and 12 of the draft bars 9 and 10 so the riding attachment will follow the turning movement; the seat spring 25 is, however, retained in its normal position of parallelism with the direct line of draft by reason of the pivots 27 and 28.

34 is a bracket secured to the member 23 by means of the bolt 27 and is held from lateral movement by means of an integral lug 38 which fits into the channel member 23. The bracket 34 carries a spring latch 35, the end of which is wedge shaped as shown in Figure 3. The wedge shaped portion of the latch 35 normally engages a recess 36 in a bracket 37 which is secured to the member 24 by means of the bolt 28 and is held from lateral movement by means of an integral lug 39 which fits into the channel member 24.

The spring latch 35 by engaging the recess 36 in the bracket 37 normally acts to prevent lateral movement of the members 23 and 24 and through them movement of the draft bars 9 and 10 and the axle 7. In this manner the riding attachment is maintained in its proper position behind the implement and the operator on the seat 26 is not subjected to the lateral twists and swings he would otherwise receive when the riding attachment is being used on rough, uneven ground or when one of the wheels 8 strikes an obstruction. However, when the course of the implement is changed by a turning movement of the draw bar 5 or by the downhill drift of the implement when being used on hillsides, the spring latch 35 will automatically disengage from the recess 36 and permit the structure to function in its normal manner as hereinbefore described.

The parts at 11ª and 12ª, together with the bars 23 and 24, and the central part of the axle, form a "parallel-rule" frame structure whose parts provide a strong attachment to the axle for the forward part of the mechanism. The forward parts of the draft bars, it will be seen, cross each other at points in front of, and close to, this swinging bracing frame. The distance between the pivots at 17 and 18 and the distance between the pivots of each pair of pivots which secure the bars 23 and 24, respectively, in place are much shorter than the distance between the pivots 3, 3 at the front ends of the draft bars. Although these bars 23 and 24 and the central part of the axle are relatively short, they provide a strong, laterally swinging frame, as noted. By positioning the rear parts of the draft bars in parallelism the distance between the pivots of the cross bar 23 and the distance between the pivots of the bar 24 are equal to each other and equal to the distance between the pivots 17 and 18, and I am enabled to dispense with the slotting of such bars as that at 23 or that at 24, in the way that has been heretofore necessary when bracing together the diverging parts of two draft bars.

And again, I secure such strength by forming the parts in the way described that I can dispense entirely with the poles or tongues which have been frequently used with earlier machines.

What I claim is—

1. In a riding attachment for agricultural implements, the combination of a draw bar, an axle, wheels for said axle, crossed draft bars pivotally connected to the draw bar and to the axle and a seat supported by said crossed draft bars.

2. In a riding attachment for agricultural implements, the combination of an axle, wheels therefor, a draw-bar freely movable laterally relatively to the axle, draft bars pivotally connected to the axle and to the draw bar and connected together by a transverse bar pivoted to the draft bars, respectively, at points at a distance apart equal to the distance between the axle pivots.

3. In a riding attachment for agricultural implements, the combination of a draw bar, an axle, wheels for said axle, crossed draft bars pivotally connected to the draw bar and to the axle, means connecting said crossed draft bars and a seat mounted on said means.

4. In a riding attachment for agricultural implements, the combination of a draw bar, an axle, wheels for said axle, crossed draft bars pivotally connected to the draw bar and to the axle, means connecting said crossed draft bars and a seat pivotally mounted on said means.

5. In a riding attachment for agricultural implements, the combination of a draw bar, an axle, wheels for said axle, crossed draft bars pivotally connected to the draw bar and to the axle, the ends of said draft bars being connected to the axle at right angles thereto, means parallel with said axle and pivotally connected to said draft bars and a seat mounted on said means.

6. In a riding attachment for agricultural implements, the combination of a draw bar, an axle, wheels for said axle, crossed draft bars pivotally connected to the draw bar and to the axle, transverse members connecting said draft bars and a yielding lock connecting said transverse members.

7. In a riding attachment for agricultural implements, the combination of a draw bar, an axle, wheels for said axle, crossed draft bars pivotally connected to the draw bar and to the axle, transverse members pivotally connected to the draft bars, a yielding lock between the transverse members acting normally to prevent relative movement thereof, thereby holding the draft bars from movement relative to the axle, and a seat supported by the said draft bars.

8. In a riding attachment for agricultural implements, the combination of a draw bar, an axle, wheels for said axle, interlaced crossed draft bars pivotally connected to the draw bar and to the axle and a seat supported by the draft bars.

9. In a riding attachment for agricultural implements the combination of an axle, wheels therefor, a draw-bar movable laterally relatively to the axle, two laterally swinging draft-bars pivoted to the axle and to the draw-bar, a transverse brace secured to the draft-bars by pivots and positively holding them laterally at a fixed distance apart.

10. In a riding attachment for agricultural implements, the combination of an axle, wheels therefor, a draft mechanism having a frame-like element secured to the axle by two spaced pivots and comprising two longitudinally positioned laterally swinging arms and a cross-brace adapted to swing laterally in parallelism with the axle and pivotally connected to said arms, draft bars extending forward from said arms, and a draw-bar pivotally connected to the front ends of the said draft bars.

JOHN V. HOLSTEIN.